United States Patent
Kawano (10) Patent No.: US 6,290,602 B1
(45) Date of Patent: Sep. 18, 2001

(54) METHOD OF CONTROLLING DEVELOPMENT OF GAME REFLECTING PLAYER'S PERSONALITY, VIDEO GAME APPARATUS AND STORAGE MEDIUM THEREFOR

(75) Inventor: Junko Kawano, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

(21) Appl. No.: 09/145,589

(22) Filed: Sep. 2, 1998

(30) Foreign Application Priority Data

Sep. 4, 1997 (JP) ................................. 9-239382

(51) Int. Cl.$^7$ .................................................. A63F 13/00
(52) U.S. Cl. ..................................... 463/23; 463/1; 463/9; 463/30; 463/37; 463/43; 273/148 B; 273/430; 434/236
(58) Field of Search ................................. 463/9, 30, 37, 463/36, 42, 1; 273/161, 429, 430, 431, 148 B, 118 R, 108; 434/236–238, 307 R; 345/474, 339; 395/613; 705/10; 704/270

(56) References Cited

U.S. PATENT DOCUMENTS

| | | | |
|---|---|---|---|
| 4,445,187 | * | 4/1984 | Best ........................................ 463/31 |
| 5,020,804 | * | 6/1991 | Weedman .......................... 273/118 R |
| 5,112,064 | * | 5/1992 | Weedman ............................... 273/429 |
| 5,358,259 | * | 10/1994 | Best ....................................... 273/434 |
| 5,393,071 | * | 2/1995 | Best ....................................... 273/434 |
| 5,393,072 | * | 2/1995 | Best ....................................... 273/434 |
| 5,393,073 | * | 2/1995 | Best ....................................... 273/434 |
| 5,395,110 | * | 3/1995 | Yamazaki et al. .................... 273/108 |
| 5,696,981 | * | 12/1997 | Shovers ................................. 434/236 |
| 5,885,156 | * | 3/1999 | Toyohara et al. ......................... 463/1 |
| 5,938,531 | * | 8/1999 | Yasushi et al. ......................... 463/36 |
| 5,954,581 | * | 9/1999 | Ohta et al. ................................ 463/9 |
| 6,024,643 | * | 2/2000 | Begis ..................................... 463/42 |
| 6,106,395 | * | 8/2000 | Begis ..................................... 463/23 |

\* cited by examiner

*Primary Examiner*—Jessica J. Harrison
*Assistant Examiner*—Yveste G Cherubin
(74) *Attorney, Agent, or Firm*—Lerner, David, Littenberg, Krumholz & Mentlik, LLP (57) ABSTRACT

During a game, options to be responded by a player character are offered to a player. Personality point values in consideration of human personalities are assigned to the options, respectively. The personality point value corresponding to a response made by the player to every offer of the options is accumulated so as to obtain an accumulated personality point value for each of the human personalities. A personality of the player is classified based on the accumulated personality point values for the respective human personalities. The speech contents of a counterpart character, the fighting contents with the counterpart character or the behavioral environments of the player character are changed depending on the classified personality of the player.

28 Claims, 7 Drawing Sheets

```
" What on earth are all these girls ? "      ··· t+1
" ∞···          She's my type . "            ··· l+2
" ☆☆☆.         She's cute . "                ··· l+2
                                        ---- OPTION
```
Scene-:-Station , Ticket Booth (outside)

FIG. 6

| SERIOUS (s) | TWISTED (t) | PUNCTILIOUS (p) | UNIQUE (u) | LEWD (l) |
|---|---|---|---|---|
| 62 | 95 | 10 | 70 | 125 |

FIG. 7A

"Yes sir! May I help you ? Are you a guest ? Well ⋯

300 yen per night . Want to spend the night ? "

FIG. 7B

"Yes sir! May I help you ? Are you a guest ? Well ⋯

You look insolent .

It's 350 yen a night . What do you want to do ? "

FIG. 7C

"Yes sir! May I help you ? Are you a guest ?

You look like an interesting guest .

For you , only 200 yen per night .

It ought to save me from being bored . "

FIG. 7D

"Yes sir! May I help you ? Are you a guest ? Well ⋯

You really look , well ⋯    LEWD .

Looking like that you must have trouble with it .

Yeah , I understand .

I'll make it half price for you . 150 yen instead of 300 !! "

METHOD OF CONTROLLING DEVELOPMENT OF GAME REFLECTING PLAYER'S PERSONALITY, VIDEO GAME APPARATUS AND STORAGE MEDIUM THEREFOR

BACKGROUND OF THE INVENTION

1. Field of the Invention

The present invention relates to a video game and, more specifically, to a technique for automatically classifying a character or personality of a player based on choices casually made by the player in response to questions offered in a role-playing game (RPG) so as to control the development of the game to reflect the player's personality.

2. Description of the Prior Art

There have been known personality analyses using computers and computer psychological games for analogizing human personalities. In such personality analyses or psychological games, the human personalities are statistically classified in advance and, by analyzing the contents of answers to questions made by a player, it is judged whether the player's personality corresponds to any one of the classified human personalities.

Accordingly, in the conventional personality analyses or psychological games, the player accomplishes one's purpose once the result of judgment is obtained. Thus, once having experienced it, the player is not likely to repeat joining it since the same judgment result would be expected.

Further, the conventional personality analyses or psychological games put too much weight on personality judgment and fail to give sufficient consideration to entertainment factors such as game scenarios, and thus tend to be boring.

SUMMARY OF THE INVENTION

Therefore, it is an object of the present invention to provide an improved game development control method.

It is another object of the present invention to provide a video game apparatus for carrying out the foregoing game development control method.

It is another object of the present invention to provide a storage medium storing a game program representing the foregoing game development control method.

According to one aspect of the present invention, there is provided a method for a game development control in a video game apparatus, wherein a counterpart character interacting with a player character operated by a player and a behavioral environment of the player character are displayed according to a game scenario, and given options to be responded by the player character are offered to the player, the method comprising the steps of assigning personality point values in consideration of human personalities to at least a part of the options, respectively; accumulating the personality point value corresponding to a response made by the player to every offer of the options so as to derive an accumulated personality point value for each of the human personalities; classifying a personality of the player based on the accumulated personality point values for the respective human personalities; and changing at least one of a speech content of the counterpart character, a fighting content with the counterpart character and the behavioral environment of the player character depending on the classified personality of the player.

According to another aspect of the present invention, there is provided a video game apparatus comprising a display section displaying a counterpart character which interacts with a player character operated by a player; an option managing section holding given options to be responded by the player character and assigning personality point values in consideration of human personalities to at least a part of the options, respectively; a personality point managing section offering the options to the player according to a game scenario, and accumulating the personality point value corresponding to a response made by the player to every offer of the options so as to derive an accumulated personality point value for each of the human personalities; a personality classifying section classifying a personality of the player based on the accumulated personality point values for the respective human personalities; and a section changing at least one of a speech content of the counterpart character and a fighting content with the counterpart character depending on the personality of the player classified at the personality classifying section.

According to another aspect of the present invention, there is provided a video game apparatus comprising a display section displaying a behavioral environment of a player character operated by a player; an option managing section holding given options to be responded by the player character and assigning personality point values in consideration of human personalities to at least a part of the options, respectively; a personality point managing section offering the options to the player according to a game scenario, and accumulating the personality point value corresponding to a response made by the player to every offer of the options so as to derive an accumulated personality point value for each of the human personalities; a personality classifying section classifying a personality of the player based on the accumulated personality point values for the respective human personalities; and a section changing the behavioral environment of the player character depending on the personality of the player classified at the personality classifying section.

It may be arranged that the personality point value is a random value.

According to another aspect of the present invention, there is provided a storage medium storing a game program which allows a computer with a display unit to work as a video game apparatus when executed by the computer, the game program allowing the computer to execute the steps of displaying a counterpart character interacting with a player character operated by a player and a behavioral environment of the player character according to a game scenario; assigning personality point values in consideration of human personalities to at least a part of given options to be responded by the player character, and offering the options to the player; accumulating the personality point value corresponding to a response made by the player to every offer of the options so as to derive an accumulated personality point value for each of the human personalities; classifying a personality of the player based on the accumulated personality point values for the respective human personalities; and changing at least one of a speech content of the counterpart character, a fighting content with the counterpart character and the behavioral environment of the player character depending on the classified personality of the player.

It may be arranged that the options include options about behavioral environments of the player character to be chosen by the player.

It may be arranged that the options include options about answers to a question made by the counterpart character.

It may be arranged that the personality of the player is classified so as to be one of the human personalities having the greatest accumulated personality point value.

It may be arranged that the game program allows the computer to further execute the step of causing a particular character to offer given words to the player which differ depending on the classified personality of the player.

BRIEF DESCRIPTION OF THE DRAWINGS

The present invention will be understood more fully from the detailed description given hereinbelow, taken in conjunction with the accompanying drawings.

In the drawings:

FIGS. 7A to 7D are diagrams showing examples of the speech contents of a counterpart character which change depending on classified personalities of a player, wherein FIGS. 7A to 7D show the cases of "serious", "twisted", "unique" and "lewd", respectively;

DESCRIPTION OF THE PREFERRED EMBODIMENT

Now, a preferred embodiment of the present invention will be described hereinbelow with reference to the accompanying drawings.

Figure 1:
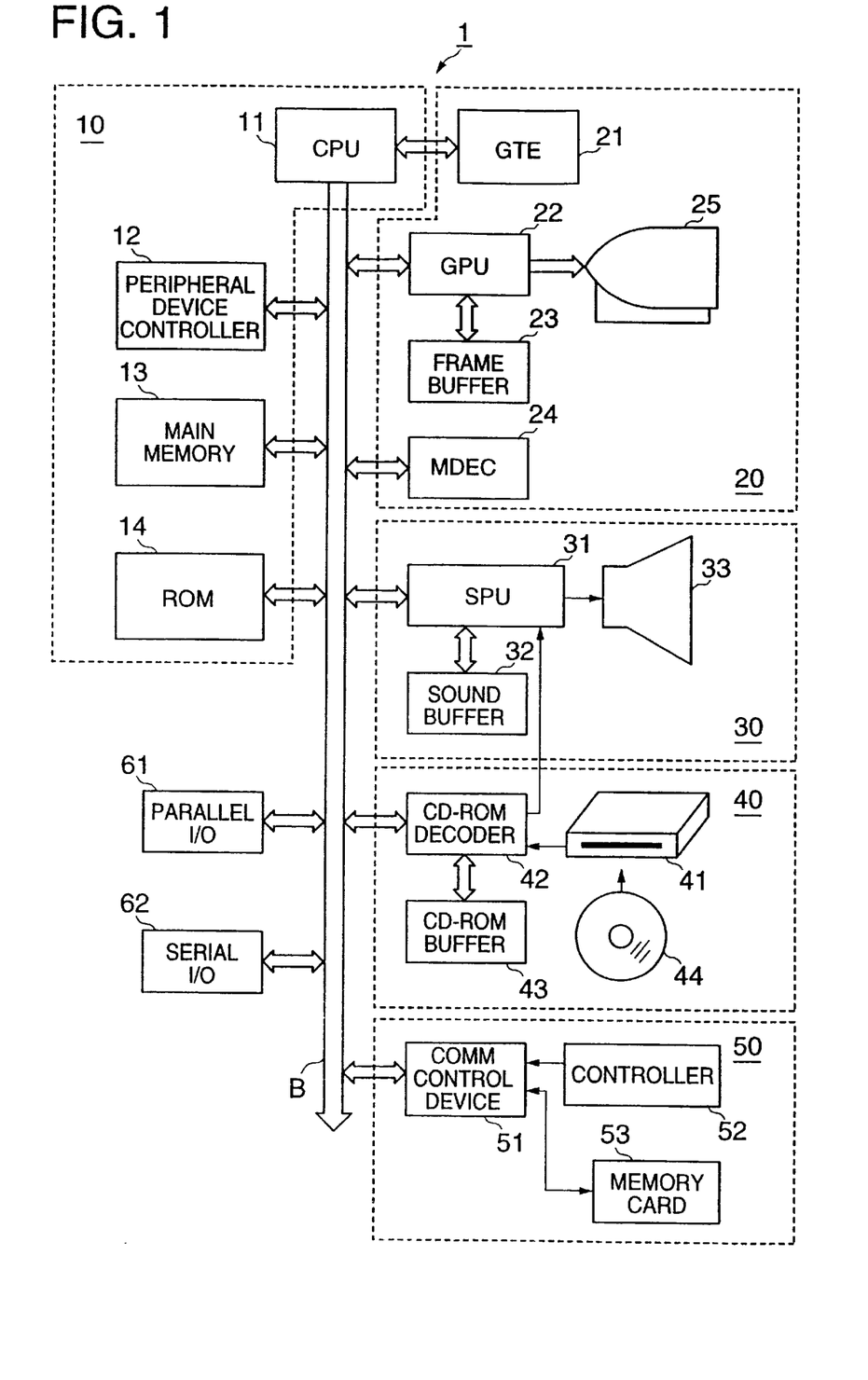
FIG. 1 is a block diagram showing a video game hardware structure which, cooperatively with a storage medium storing a characteristic game program, constitutes a video game apparatus according to a preferred embodiment of the present invention.

Referring to FIG. 1, a video game hardware structure which, cooperatively with a storage medium storing a characteristic game program, constitutes a video game apparatus according to the preferred embodiment of the present invention.

The hardware structure reads out a game program (in the following description, the game program also includes necessary image data and control parameters) from a CD-ROM as one example of the storage medium and executes it so as to carry out displaying and controlling of behavior of a player character depending on commands from a player, behavior of counterpart characters, behavioral environments around the player character and so forth.

As shown in FIG. 1, the hardware structure 1 comprises a main control section 10, an image processing section 20, a sound processing section 30, a disk control section 40, a communication control section 50 and a main bus B connecting the foregoing functional blocks 10 to 50 to allow two-way communications among them.

The main control section 10 comprises a CPU 11, a peripheral device controller 12 for carrying out an interrupt control, a DMA (direct memory access) transfer control, etc., a main memory 13 for temporarily storing a game program read out from a CD-ROM 44, and a ROM 14 storing an operating system (OS) etc. for managing the image processing section 20, the sound processing section 30, etc. The CPU 11 is a RISC (reduced instruction set computer) CPU, executing the OS stored in the ROM 14 to control the basic operation of the whole apparatus and further executing the game program stored in the main memory 13 to realize a plurality of functional blocks which will be described later.

The image processing section 20 comprises a geometry transfer engine (GTE) 21 carrying out high-speed coordinate transformation relative to data stored in the main memory 13 and so forth, a graphics; processing unit (GPU) 22 for drawing polygons, such as triangles and quadrilaterals, and sprites according to drawing commands from the CPU 11 so as to form images of various characters and environments, a frame buffer 23 for storing the images drawn by the GPU 22, and an image decoder (MDEC) 24 for decoding compressed image data according to necessity. A display unit 25 reads out data stored in the frame buffer 23 and displays them.

The sound processing section 30 comprises a sound processing unit (SPU) 31 for producing game sounds, sound effects, etc. according to commands from the CPUI 11, a sound buffer 32 for storing voice data, sound data, tone generator data, etc. read out from the CD-ROM 44, and a loudspeaker 33 for outputting the game sounds, the sound effects, etc. produced at the SPU 31. The SPU 31 has an ADPCM decoding function of, for example, reproducing voice data from 4-bit differential signals obtained by applying adaptive differential pulse code modulation (ADPCM) to 16-bit voice data, a function of producing sound effects by reproducing tone generator data stored in the sound buffer 32, a modulating function of modulating and reproducing voice data etc. stored in the sound buffer 32, and so forth. Given such functions, the SPU 31 can be used as a sampling tone generator for producing musical sounds, sound effects, etc. based on voice data etc. stored in the sound buffer 32 according to commands from the CPU 11.

The disk control section 40 comprises a disk drive 41 for reproducing a game program stored in the CD-ROM 44, a CD-ROM decoder 42 for decoding data added with an error correcting code (ECC), and a CD-ROM buffer 43 for temporarily storing reproduced data from the disk drive 41. The CD-ROM decoder 42 constitutes a part of the sound processing section 30.

Voice data stored in the CD-ROM 44 and read out at the disk drive 41 include, other than the foregoing ADPCM data, so-called PCM data obtained by applying analog-to-digital conversion to voice signals. Voice data stored as ADPCM data and representing, for example, differentials of 16-bit digital data by 4 bits is subjected to error correction and decoding at the CD-ROM decoder 42, then fed to the SPU 31 for digital-to-analog conversion etc., and thereafter used to drive the loudspeaker 33. On the other hand, voice data stored as PCM data in the form of, for example, 16-bit digital data is decoded at the CD-ROM decoder 42 and then used to drive the loudspeaker 33. An audio output from the CD-ROM decoder 42 is once inputted into the SPU 31 where it is mixed with an SPU output, and then inputted into a reverb unit so as to be a final audio output.

The communication control section 50 comprises a communication control device 51 for controlling communication with the CPU 11 via the main bus B, a controller 52 and a memory card 53. The controller 52 is an interface for inputting commands from the player and includes a start key for commanding the start or restart of a game, a reset key for commanding the reset of the game, a selection key for commanding movement of a player character in vertical and lateral directions and moving a cursor to desired one of menus or items, a command key for commanding detailed behavior of the player character and commanding a selected menu, and so forth. The controller 52 transmits the state of each key to the communication control device 51 in synchronous communication. The communication control device 51 notifies the state of each key of the controller 52 to the CPU 11. In this fashion, the commands from the player are given to the CPU 11 so that the operation is carried out according to an intention of the player.

If the setting of a game on execution, the final or intermediate result of the game or the like needs to be stored, the CPU 11 sends the necessary data to the communication control device 51 which then stores the data from the CPU 11 into the memory card 53. Since the memory card 53 is separated from the main bus B, it can be loaded or unloaded with the power being on. Accordingly, the setting of the game etc. can be stored in a plurality of memory cards 53.

The hardware structure 1 further comprises a parallel input/output (I/O) port 61 and a serial input/output (I/O) port 62 connected to the main bus B, respectively. Connection to a peripheral device can be achieved via the parallel I/O port 61, while connection to another video game apparatus can be achieved via the serial I/O port 62.

Figure 2:
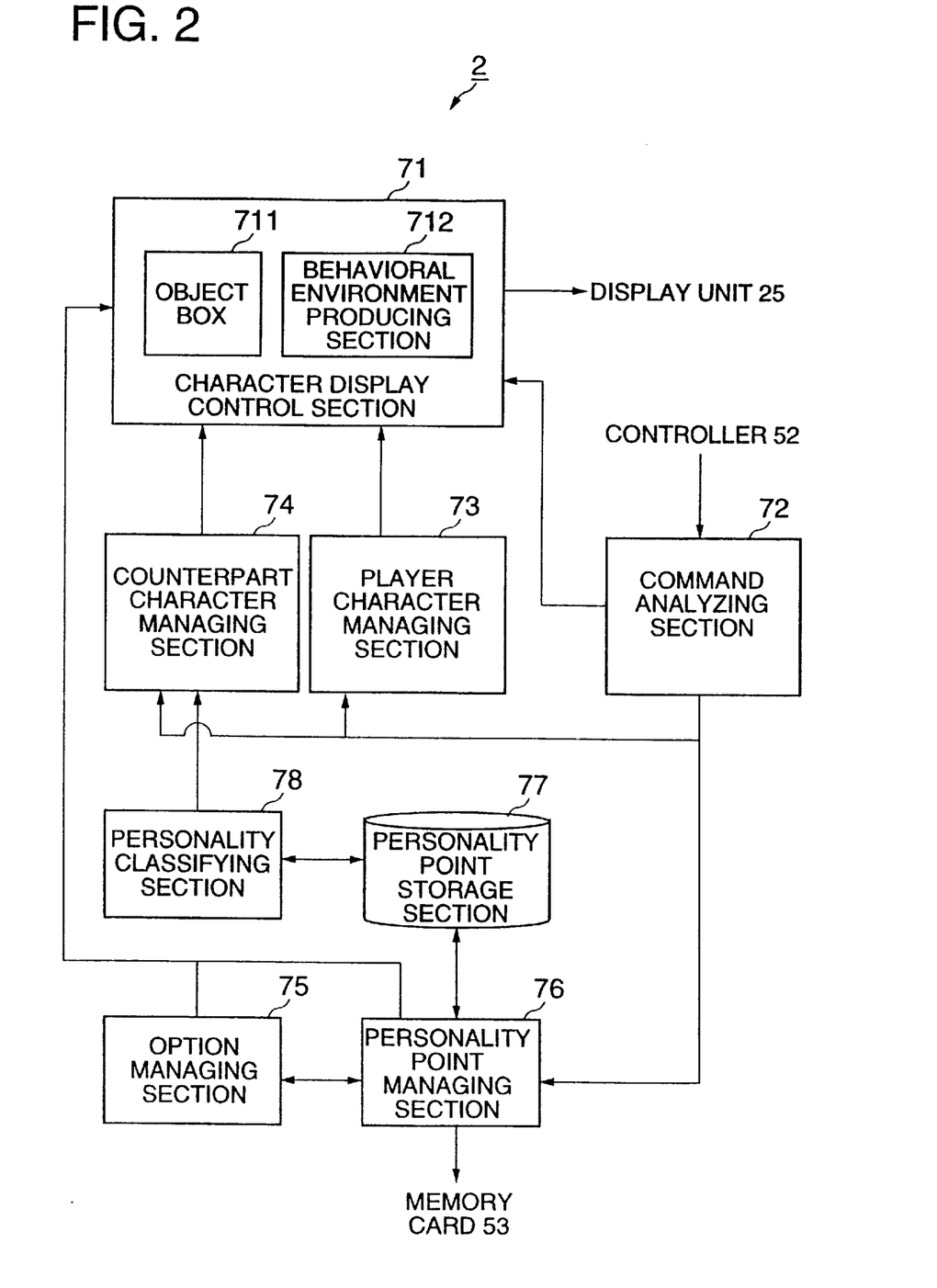
FIG. 2 is a functional block diagram of the video game apparatus according to the preferred embodiment of the present invention.

In the foregoing hardware structure 1, when the power gets on or a reset process is executed while the CD-ROM 44 is loaded in the disk drive 41, the CPU 11 executes the OS stored in the ROM 14 to first initialize the whole apparatus, then control the disk control section 40 to read out the game program stored in the CD-ROM 44 and transfer it into the main memory 13, and then execute it. Through the execution of the game program, the CPU 11 realizes the functional blocks as shown in FIG. 2 so that the video game apparatus generally designated at numeral 2 is presented.

Specifically, the video game apparatus 2 comprises functional blocks of a character display control section 71, a command analyzing section 72, a player character control section 73, a counterpart character control section 74, an option managing section 75, a personality point managing section 76, a personality point storage section 77 and a personality classifying section 78.

The character display control section 71 holds at an object box 711 objects of a player character to be operated by a player and a plurality of counterpart characters. The character display control section 71 superimposes upon occasion the respective characters and option choosing images from the option managing section 75, which will be described later, over the behavioral environments produced at a behavioral environment producing section 712 according to a game scenario and displays them on the display unit 25. The behavioral environments represent environments where the player character acts, such as shops, roads and other background environments.

The command analyzing section 72 analyzes commands from the controller 52 and carries out necessary controls. The commands from the controller 52 include, for example, a command for start/stop/restart/end of the game and a command for behavior of the player character, and further include selection of speech/behavior of the player character based on a choice made by the player among a plurality of options. Further, the command analyzing section 72 loads into the main memory 13 the game program from the CD-ROM 44 and the saved data from the memory card 53 upon the start or restart of the game. Further, upon the stop or end of the game, the command analyzing section 72 saves game data, such as personality point values, scored up to then into the memory card 53.

When a command from the controller 52 as analyzed at the command analyzing section 72 is a command for behavior of the player character, the player character managing section 73 causes the player character on the display unit 25 to make a corresponding motion.

The counterpart character managing section 74 manages speech and behavior of each of the counterpart characters and autonomously controls the speech and behavior of each counterpart character not based on the player but based on an. output of the personality classifying section 78 which will described later. The counterpart characters include, for example, a character which fights the player character, a character which does not fight the player character but converses with the player character, a character which speaks to the player character unilaterally, a character which does not converse with the player character but shows various individualities, a character which neither fights nor converses with the player character but appears as a third party, and a character which appears as a throw-in at the end of the game.

The option managing section 75 holds questions each including a plurality of options to be chosen by the player, such as options as to ways to go first, options as to the contents of speeches to be made by the player character along the game scenario, and other options, and further holds optional guidance information and answers thereof. In this embodiment, personality point values in consideration of human personalities are assigned to at least a part of the options as to the contents of speeches to be made by the player character.

In this embodiment, "serious", "twisted", "punctilious", "unique" and "lewd" are defined as the foregoing human personalities. Among options choosable by the player, an option corresponding to "serious" is assigned a point adding expression of "s plus a point value to be added", an option corresponding to "twisted" is assigned a point adding expression of "t plus a point value to be added", an option corresponding to "punctilious" is assigned a point adding expression of "p plus a point value to be added", an option corresponding to "unique" is assigned a point adding expression of "u plus a point value to be added", and an option corresponding to "lewd " is assigned a point adding expression of "1 plus a point value to be added".

Figure 3:
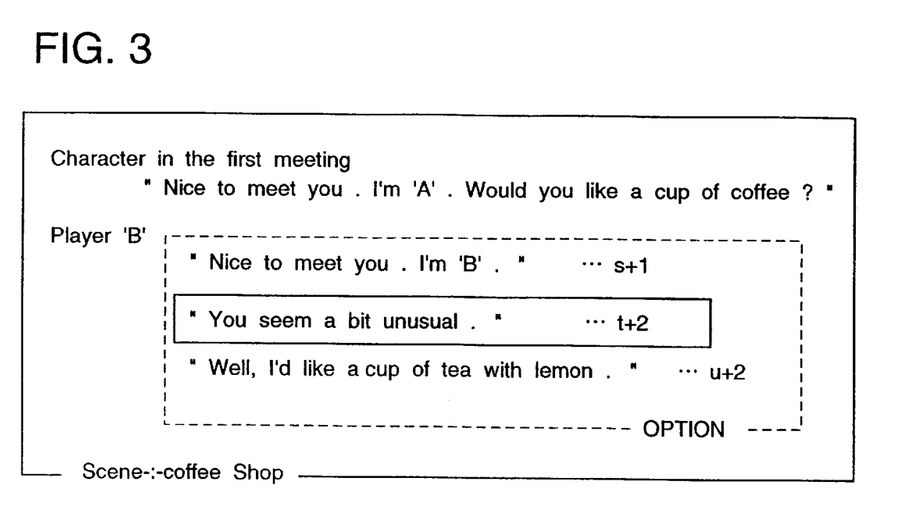
FIG. 3 is an explanatory diagram showing an example of options assigned personality point values, respectively.

For example, FIG. 3 shows an example of options in a dialogue when a player character (player B) enters a coffee shop. The option "Nice to meet you. I'm 'B'." is rather normal so that a point adding expression of "s+1" is assigned thereto. The option "You seem a bit unusual." is much twisted so that "t+2" is assigned thereto. The option "Well, I'd like a cup of tea with lemon." is very unique so that "u+2" is assigned thereto. The point adding expression chosen first by the player is effective. In the example of FIG. 3, the personality of "twisted" is added with a personality point value of two.

Figure 4:
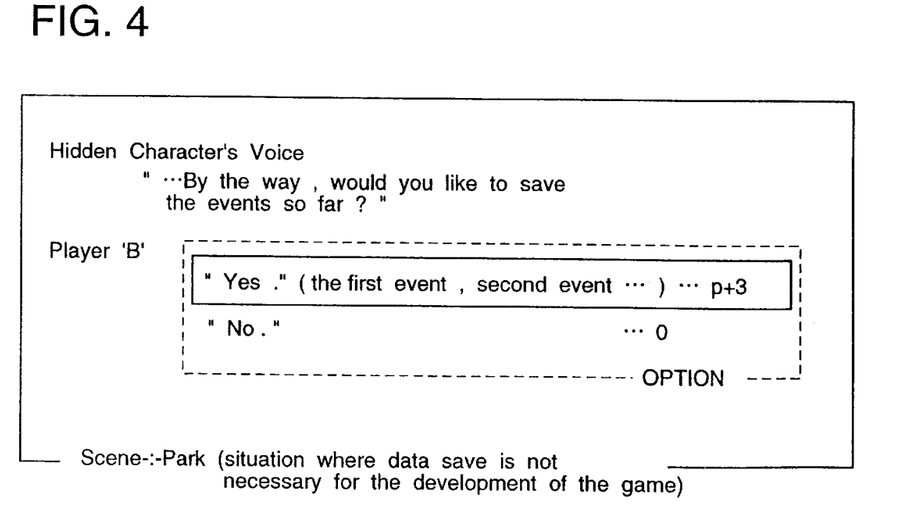
FIG. 4 is an explanatory diagram showing another example of options one of which is assigned a personality point value while the other is assigned no such a personality point value.

In an example shown in FIG. 4, although the scene does not necessarily require data save, an option for requesting the data save is chosen. Since this option is quite punctilious, "p+3" is assigned thereto. As appreciated from FIG. 4, the second option is not assigned a point adding expression. It is not necessary that all the options are assigned point adding expressions.

Figure 5:
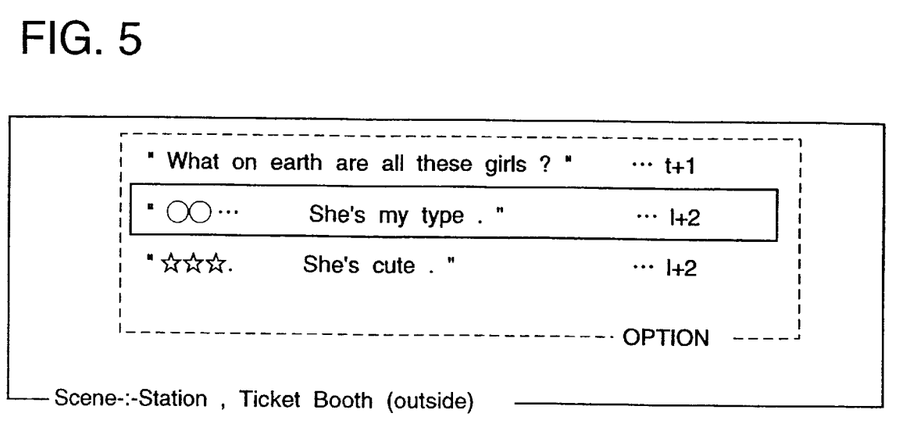
FIG. 5 is an explanatory diagram showing another example of options assigned personality point values, respectively.

FIG. 5 shows options at a ticket booth in a station, assuming that two girls are present at the ticket booth. Since the second and third options are lewd, "1+2" is assigned to each of them.

The point adding expression is normally assigned according to the contents of the corresponding option, but may be assigned at random depending on a certain option. For example, assuming that a plurality of speeches of the same contents are made in various scenes, a personality point value to be added may be changed at random per scene, or a personality to be added with a personality point value may be changed at random per use of a particular function item acquired in the course of the game. In the latter case, for example, a point adding expression of "x+5" is assigned to a particular option, then "x" representing a player's personality may be changed depending on a function item. In this case, however, the assigned personality is notified to the player through displaying on the display unit 25. In this fashion, by providing the scene where the point adding expression is changed at random, variety is given to the personality analysis so as to enhance entertainment of the game.

Figure 6:
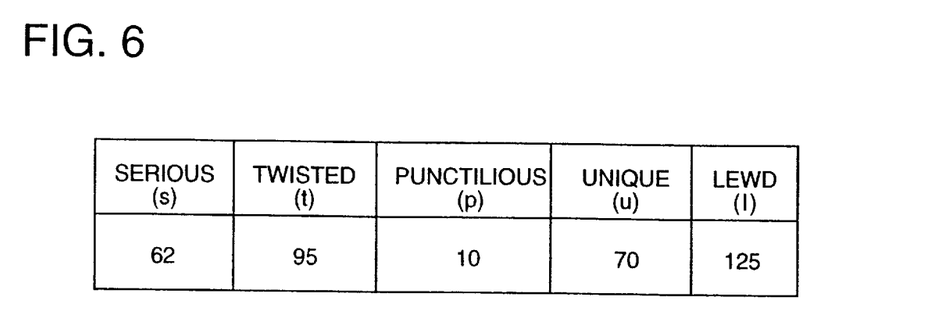
FIG. 6 is a diagram showing an example of the contents of a personality point storage section shown in FIG. 2.
Figure 7A:
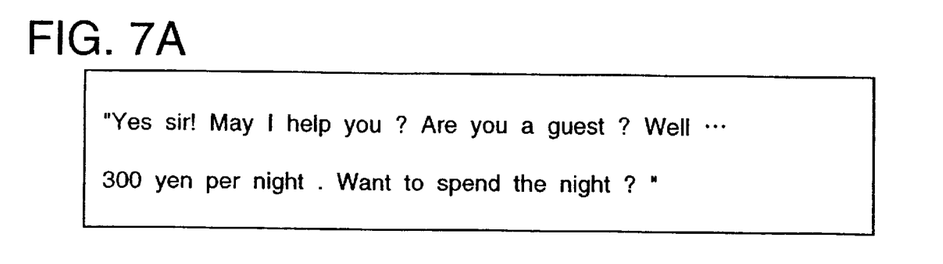
Figure 7B:
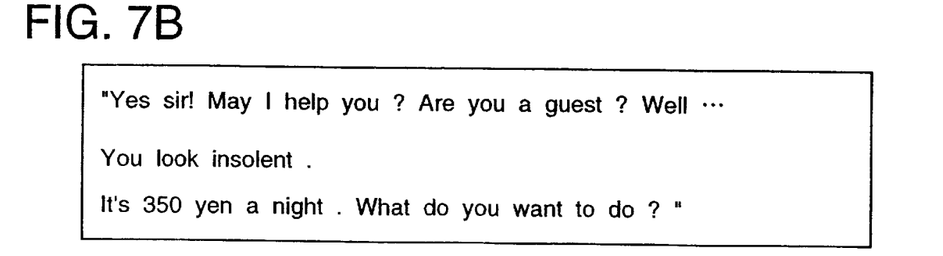
Figure 7C:
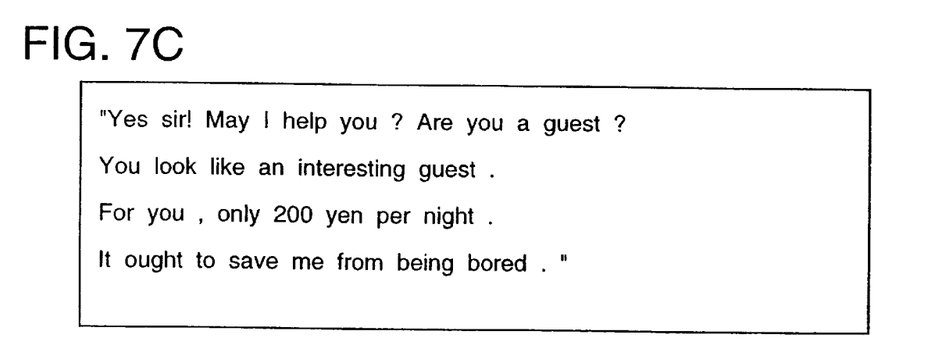
Figure 7D:
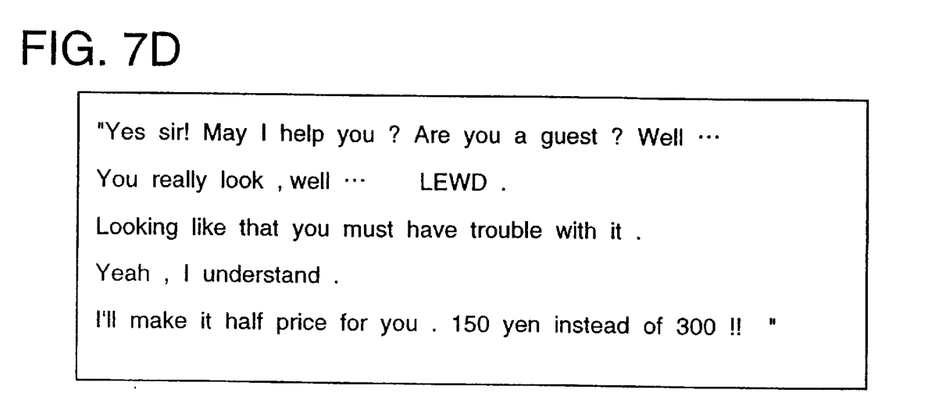

The personality point managing section 76 offers the foregoing options to the player according to the game scenario via the character display control section 71 and the display unit 25. Further, every time the player responds to the options in a corresponding scene, the personality point managing section 76 adds in the personality point storage section 77 a personality point value to the personality represented by a corresponding point adding expression. Thus, in the personality point storage section 77, an accumulated point value is obtained for each of the foregoing five personalities as shown in FIG. 6.

In response to a personality check command from the player, the personality classifying section 78 classifies the player's personality into one of the five personalities based on the accumulated personality point values stored in the personality point storage section 77. Specifically, the personality corresponding to the greatest accumulated personality point value is determined to be the player's personality at the personality classifying section 78. In an example shown in FIG. 6, "lewd " is determined to be the player's personality. This determination result is notified to the counterpart character managing section 74. The counterpart character managing section 74 changes the contents of speeches of a counterpart character to be displayed depending on the determined player's personality. This is shown in FIGS. 7A to 7D, wherein the landlord of an inn, as a counterpart character, changes lodging charges offered to a player character depending on determined players personalities. FIGS. 7A to 7D show the cases of "serious", "twisted", "unique" and "lewd ", respectively.

In this embodiment, the foregoing personality check command. from the player is inputted when the player character enters a divination mansion displayed as a behavioral environment in an image.

Now, a game procedure in the foregoing video game apparatus 2 will be described with reference to a flowchart shown in FIGS. 8 and 9.

Figure 8:
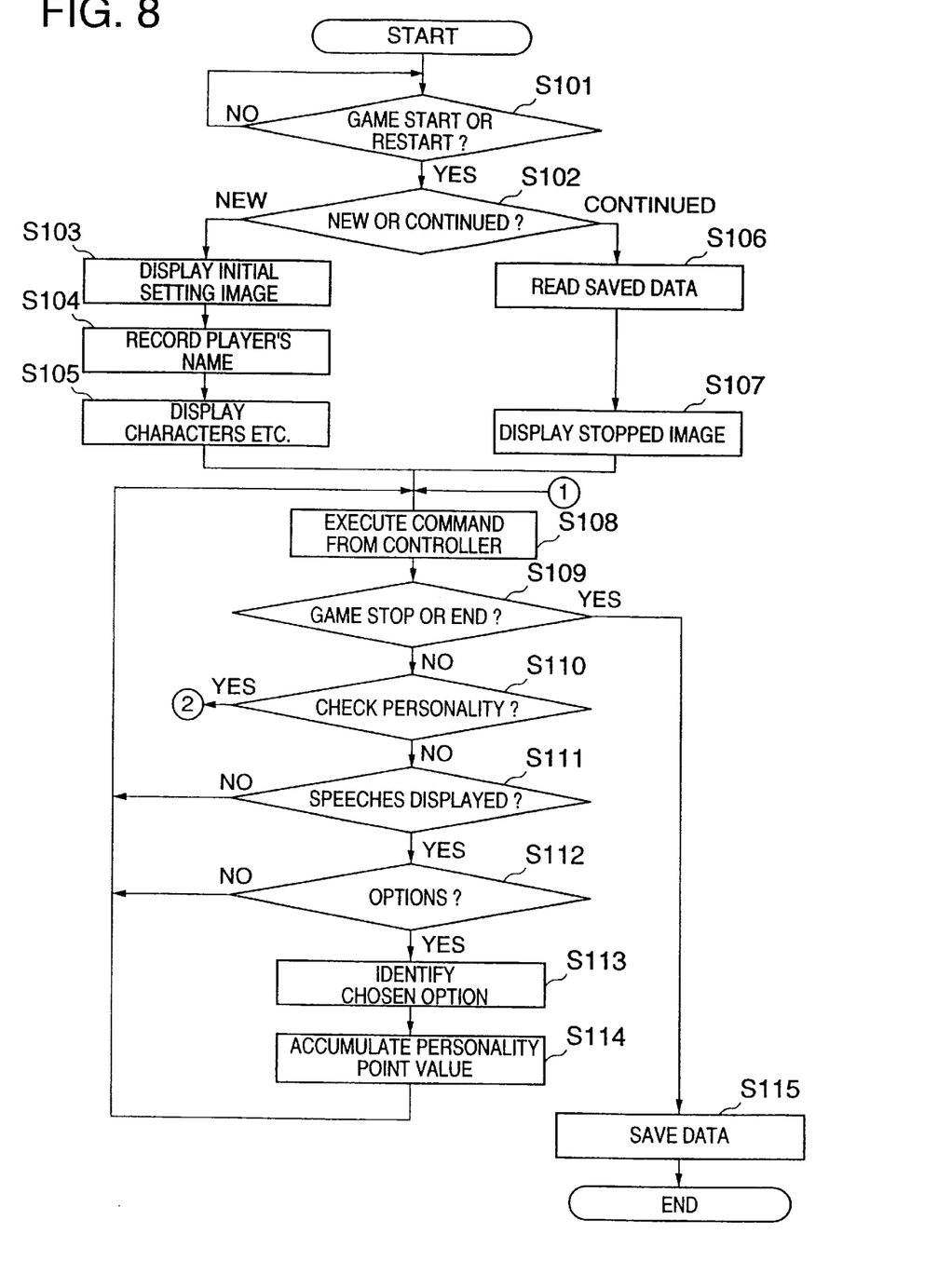
FIGS. 8 and 9 are diagrams showing a flowchart representing a, game procedure according to the video game apparatus shown in FIG. 2.

In FIG. 8, when the start or restart of a game is commanded (Yes at step S101) via the controller 52, the command analyzing section 72 judges whether it is a new game or a continued game (step S102). If it is the new game, the command analyzing section 72 notifies it to the character display control section 71 which then displays an initial setting image for setting necessary items (step S103).

Thereafter, a player's name is recorded (step S104), and images of the characters and behavioral environment are displayed (step S105). Now, the player can operate the player character and start the game via the controller 52. On the other hand, if it is the continued game as judged at step S102, saved data relating to the subject player are read out (step S106) so that a stopped image, that is, an image at the time of the game stop, is displayed (step S107). Accordingly, the player can restart the game from the time point of the game stop.

Subsequently, commands from the player via the controller 52 are carried out following the game scenario (step S108), and it is constantly monitored and checked whether the game stop or end is commanded (step S109) and whether a personality check is commanded (step S110). The personality check is carried out according to the player's will to check the current personality point values. In this embodiment, as described above, the divination mansion is provided, and the player character visits there for the personality check, which will be described later.

If neither the game stop/end nor the personality check is commanded (No at steps S109 and S110), the contents of speeches are displayed (Yes at step S111). Then, if the displayed speech contents are optional (Yes at step S112), the personality point managing section 76 identifies an option chosen by the player (step S113) and accumulates the corresponding personality point value in the personality point storage section 77 according to an assigned point adding expression (step S114).

The foregoing processes are repeated until the game stop or end is commanded via the controller 52 (during No at step S109). If the game stop or end is commanded (Yes at step S109), data up to then is saved (step S115) and the routine is terminated.

Figure 9:
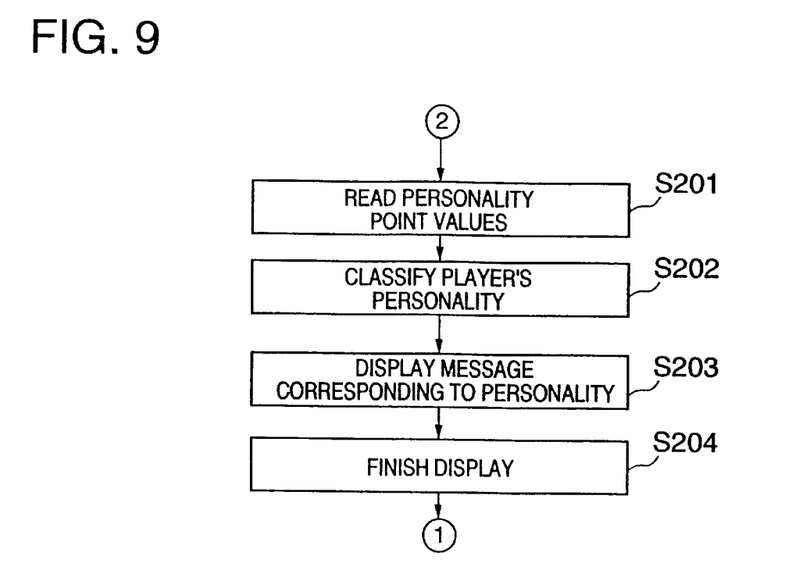
Figure 10:
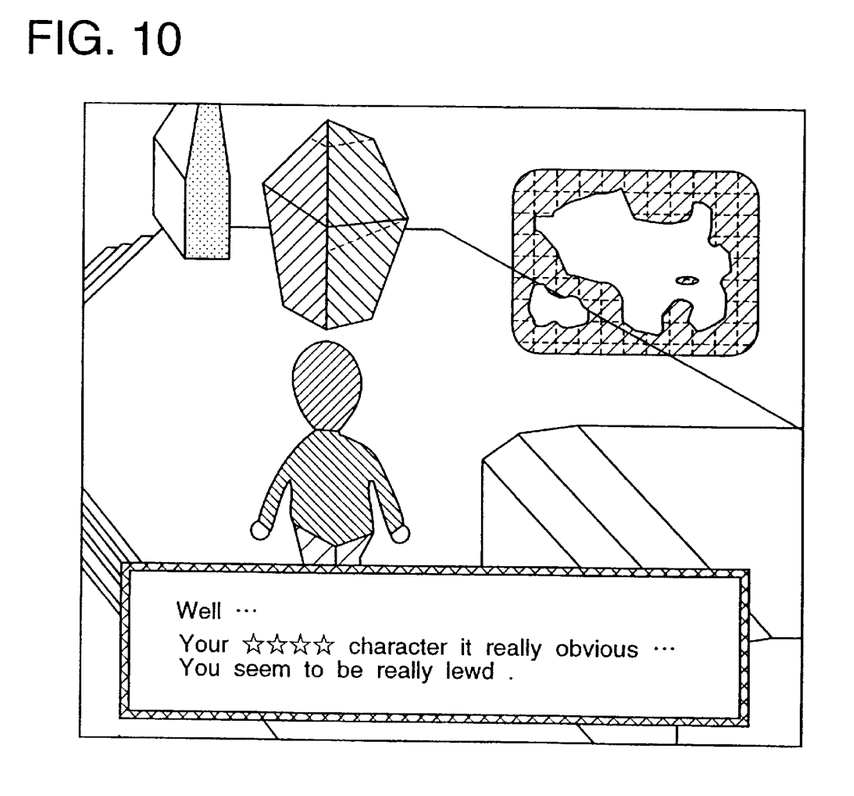
FIG. 10 is an explanatory diagram showing an example of a display image of a divination mansion for carrying out a player's personality check.

FIG. 9 shows a procedure for carrying out the personality check requested at step S110 in FIG. 8, and FIG. 10 shows an example of an image display of the divination mansion where the personality check is performed.

Specifically, when the player character enters the divination mansion, the personality classifying section 78 reads out the accumulated personality point values from the personality point storage section 77 (step S201) and identifies the greatest value among them to classify the player's personality into one of the foregoing five personalities, i.e. "serious", "twisted", "punctilious", "unique" and "lewd " (step S202). Then, a message corresponding to the classified personality is displayed as shown in FIG. 10 together with sound effects (step S203). In response to a display finish command from the player via the controller 52, the routine returns to step S108 in FIG. 8 (step S204).

When the game scenario is finished, the counterpart character managing section 74 selects a throw-in character for a display. In this event, the throw-in character offers given words to the player depending on the foregoing classified personality. This increases entertainment of the game.

In the foregoing preferred embodiment, the player's personality is analyzed based on only the options about the player's speeches. However, it Is also possible to analyze the player's personality based on a combination of the speech options and other options. For example, it may be arranged that point adding expressions are also. assigned to options about player's behavioral environments, such as shops and ways to choose, so that personality point values are also increased upon choosing the corresponding options about the player's behavioral environments. This further increases entertainment of the game and classifies the player's personality more precisely.

Further, in the foregoing preferred embodiment, only the speech contents of the counterpart character are changed depending on the classified player's personality. However, it may be arranged to change, for example, at least one of the speech contents of a counterpart character, the fighting contents with a counterpart character and the behavioral environments of a player character depending on the classified player's personality.

As appreciated from the foregoing description, in the video game apparatus according to the preferred embodiment of the present invention, the player's personality can be analyzed based on the options casually chosen by the player during the game. Further, since the response manner of the counterpart character changes depending on the result of the personality analysis, the entertainment of the RPG is enhanced. Further, by utilizing the foregoing storage medium storing the characteristic game program, the foregoing video game apparatus can be easily realized using a computer.

While the present invention has been described in terms of the preferred embodiments, the invention is not to be limited thereto, but can be embodied in various ways without departing from the principle of the invention as defined in the appended claims.

What is claimed is:

1. A method of controlling the development of a game, wherein a counterpart character interacting with a player character operated by a player and a behavioral environment of the player character are displayed according to a game scenario, said method comprising the steps of:
   offering questions to the player while the game is progressing according to the game scenario, each of said questions having a plurality of options for allowing the player to select one of said options, wherein personality point values associated with human personalities are assigned to at least one of said options;
   deriving during the game being progressed an accumulated personality point value for each of said human personalities by adding per human personality the personality point values assigned to the options selected by the player in response to the offered questions;
   classifying during the game being progressed a personality of the player into one of said human personalities based on the accumulated personality point values for the respective human personalities; and
   changing during the game being progressed at least one of a speech content of the counterpart character, a fighting content with the counterpart character and the behavioral environment of the player character depending on said classified personality of the player.

2. The method according to claim 1, wherein the step of classifying is executed only when a personality check command is input from the player during the game being progressed.

3. The method according to claim 1, further comprising the step of displaying a message corresponding to the classified personality of the player.

4. The method according to claim 3, wherein said message is displayed when the player character is in a predetermined place.

5. A video game apparatus comprising:
   a display section displaying a counterpart character which interacts with a player character operated by a player;
   an option managing section storing a plurality of questions each having a plurality of options to be selected by the player character while the game is progressing and assigning personality point values associated with human personalities to at least one of said options;
   a personality point managing section offering said options to the player according to a game scenario;
   a personality point storage section accumulating personality point values for each of said human personalities by adding per human personality the personality point values assigned to the options selected by the player in response to the offered question by said personality point managing section;
   a personality classifying section classifying during the game being progressed a personality of the player into one of said human personalities based on the accumulated personality point values for the respective human personalities; and
   a section changing during the game being progressed at least one of a speech content of the counterpart character and a fighting content with the counterpart character depending on the personality of the player classified at said personality classifying section.

6. The video game apparatus according to claim 5, wherein said personality point value is a random value.

7. The video game apparatus according to claim 5, wherein the classifying by the personality classifying section is executed only when a personality check command is input from the player during the game being progressed.

8. The video game apparatus according to claim 5, wherein said display section displays a message corresponding to the classified personality of the player.

9. The video game apparatus according to claim 8, wherein said message is displayed when the player character is in a predetermined place.

10. The video game apparatus according to claim 5, wherein said assigning personality point values correspond to a response made by the player to every offer of said options.

11. A video game apparatus comprising:
    a display section displaying a behavioral environment of a player character operated by a player;
    an option managing section storing a plurality of questions and having a plurality of options to be selected by the player character while the game is progressing and assigning personality point values associated with human personalities to at least one of said options;
    a personality point managing section offering said options to the player according to a game scenario;
    a personality point storage section accumulating personality point values for each of said human personalities by adding per human personality the personality point values assigned to the options selected by the player in response to the offered question by said personality point managing section;
    a personality classifying section classifying during the game being progressed a personality of the player into one of said human personalities based on the accumulated personality point values for the respective human personalities; and
    a section changing during the game being progressed the behavioral environment of the player character depending on the personality of the player classified at said personality classifying section.

12. The video game apparatus according to claim 11, wherein said personality point value is a random value.

13. The video game apparatus according to claim 11, wherein the classifying by the personality classifying section is executed only when a personality check command is input from the player during the game being progressed.

14. The video game apparatus according to claim 11, wherein said display section displays a message corresponding to the classified personality of the player.

15. The video game apparatus according to claim 14, wherein said message is displayed when the player character is in a predetermined place.

16. The video game apparatus according to claim 11, wherein said assigning personality point values correspond to a response made by the player to every offer of said options.

17. A storage medium storing a game program which allows a computer with a display unit to operate as a video game apparatus when said program is executed by the computer, said game program allowing said computer to execute the steps of:

displaying a counterpart character interacting with a player character operated by a player and a behavioral environment of the player character according to a game scenario;

offering questions to the player while the game is progressing according to the game scenario, each of said questions having a plurality of options for allowing the player to select one of said options, wherein personality point values associated with human personalities are assigned to at least one of said options;

deriving during the game being progressed an accumulated personality point value for each of said human personalities by adding per human personality the personality point values assigned to the options selected by the player in response to the offered questions;

classifying during the game being progressed a personality of the player into one of said human personalities based on the accumulated personality point values for the respective human personalities; and changing during the game being progressed at least one of a speech content of the counterpart character, a fighting content with the counterpart character and the behavioral environment of the player character depending on said classified personality of the player.

18. The storage medium according to claim 17, wherein said options include options about behavioral environments of the player character to be chosen by the player.

19. The storage medium according to claim 17, wherein said options include options about answers to a question made by the counterpart character.

20. The storage medium according to claim 17, wherein the personality of the player is classified so as to be one of the human personalities having the greatest accumulated personality point value.

21. The storage medium according to claim 17, wherein said game program allows the computer to further execute the step of causing a particular character to offer given words to the player which differ depending on said classified personality of the player.

22. The storage medium according to claim 17, wherein the step of classifying is executed only when a personality check command is input from the player during the game being progressed.

23. The storage medium according to claim 17, further comprising the step of displaying a message corresponding to the classified personality of the player.

24. The storage medium according to claim 23, wherein said message is displayed when the player character is in a predetermined place.

25. The storage medium according to claim 17, wherein said assigning of personality point values correspond to a response made by the player to every offer of said options.

26. A video game apparatus comprising:

a display section displaying a counterpart character which interacts with a player character operated by a player;

an option managing section holding given options to be responded by the player character and assigning personality point values in consideration of human personalities to at least a part of said options, respectively;

a personality point managing section offering said options to the player according to a game scenario, and accumulating the personality point value corresponding to a response made by the player to a plurality of said options so as to derive an accumulated personality point value for each of said human personalities, wherein said personality point value is a random value;

a personality classifying section classifying a personality of the player based on the accumulated personality point values for the respective human personalities; and a section changing at least one a speech content of the counterpart character and a fighting content with the counterpart character depending on the personality of the player classified at said personality classifying section.

27. A video game apparatus comprising:

a display section displaying a behavioral environment of a player character operated by a player;

an option managing section holding given options to be responded by the player character and assigning personality point values in consideration of human personalities to at least a part of said options, respectively;

a personality point managing section offering said options to the player according to a game scenario, and accumulating the personality point value corresponding to a response made by the player to a plurality of said options so as to derive an accumulated personality point value for each of said human personalities, wherein said personality point value is a random value;

a personality classifying section classifying a personality of the player based on the accumulated personality point values for the respective human personalities; and a section changing the behavioral environment of the player character depending on the personality of the player classified at said personality classifying section.

28. A storage medium storing a game program which allows a computer with a display unit to work as a video game apparatus when executed by the computer, said game program allowing said computer to execute the steps of:

displaying a counterpart character interacting with a player character operated by a player and a behavioral environment of the player character according to a game scenario;

assigning personality point values in consideration of human personalities to at least a part of given options to be responded by the player character, and offering said options to the player;

accumulating the personality point value corresponding to a response made by the player to a plurality of said options so as to derive an accumulated personality point value for each of said human personalities;

classifying a personality of the player based on the accumulated personality point values for the respective human personalities; and changing at least one of a speech content of the counterpart character, a fighting content with the counterpart character and the behavioral environment of the player character depending on said classified personality of the player, wherein said game program allows the computer to further execute the step of causing a particular character to offer given words to the player which differ depending on said classified personality of the player.

* * * * *